No. 832,436. PATENTED OCT. 2, 1906.
R. WASHBURN.
FRUIT PICKER.
APPLICATION FILED MAR. 3, 1905.
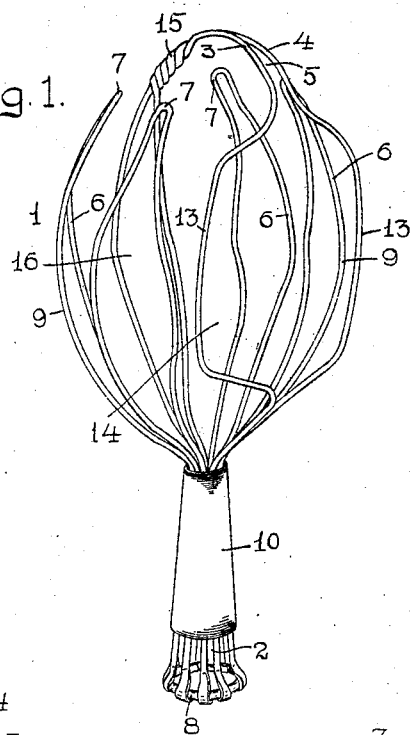
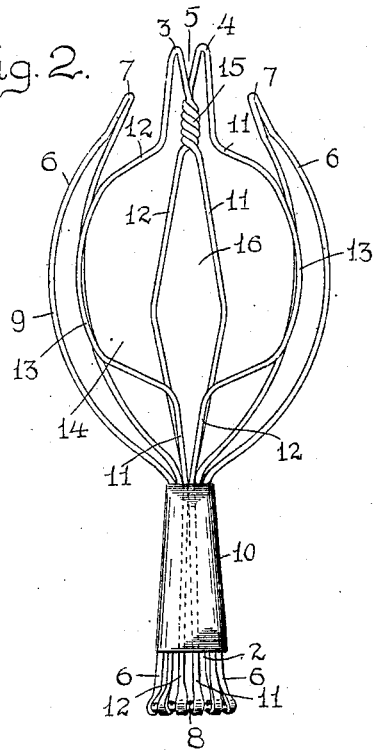
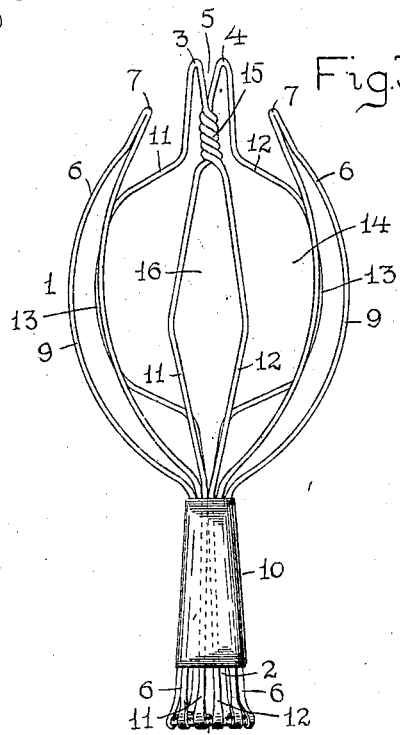
Witnesses
Roy D. Tolman.
Penelope Comberbach.
Inventor
Reginald Washburn
By Rufus B. Fowler
Attorney

UNITED STATES PATENT OFFICE.

REGINALD WASHBURN, OF WORCESTER, MASSACHUSETTS, ASSIGNOR TO THE WIRE GOODS COMPANY, OF WORCESTER, MASSACHUSETTS, A CORPORATION OF MASSACHUSETTS.

FRUIT-PICKER.

No. 832,436.  Specification of Letters Patent.  Patented Oct. 2, 1906.

Application filed March 3, 1905. Serial No. 248,199.

*To all whom it may concern:*

Be it known that I, REGINALD WASHBURN, a citizen of the United States, residing at Worcester, in the county of Worcester and Commonwealth of Massachusetts, have invented a new and useful Improvement in Fruit-Pickers, of which the following is a specification, accompanied by drawings, forming a part of the same, in which—

Figure 1 is a perspective view of my improved fruit-picker. Fig. 2 is a front elevation, and Fig. 3 is a rear elevation.

Similar reference-numerals refer to similar parts in the different views.

My invention relates to that class of fruit-pickers which comprise a basket-shaped receptacle, of wire, mounted upon a long handle, so that fruit may be conveniently picked from the higher portions of the tree or from otherwise inaccessible positions; and it consists in the novel features of construction by which the fruit may be seized and severed from the tree, as hereinafter described, and pointed out in the annexed claims.

Referring to the accompanying drawings, 1 denotes the receptacle for the fruit provided with a socket 2 to receive a handle (not shown) and having at the top a pair of convergent wires 3 and 4, inclosing an acute-angled space 5, into which the stem of the fruit is entered when a slight pulling strain upon the fruit serves to break the stem from the tree. The receptacle 1 consists of a series of curved wires 6, bent upon themselves at their central sections at 7 and having their ends inclosing a ring 8. Between the ring 8 and the curved portions 9 the wires 6 are brought together to form the tapering socket 2 and are inclosed in a sleeve 10, preferably formed by winding the wires with a finer wire.

The device by which the fruit is severed from the tree consists of two wires 11 and 12, having their opposite ends attached to the ring 8 and inclosed within the sleeve 10. On one side of the receptacle the wires 11 and 12 are spread apart at 13 13 to form an opening 14 between the wires large enough to admit the fruit to be picked. As the wires approach the top of the receptacle they gradually converge to inclose a narrow acute-angled space 5, adapted to receive the stem of the fruit. The wires 11 and 12 are then twisted together at 15, and between the twist 15 and the sleeve 10 the wires are separated to form a space 16 between the wires, which are curved to conform to the ellipsoidal shape of the receptacle 1.

The wires 11 and 12 form a portion of the receptacle 1 and also constitute the fruit-plucking device by which the fruit is severed from the tree by a pulling strain applied to the fruit after its stem has been entered within the space 5. By twisting the wires 11 and 12 together at 15 the converging sections 3 and 4 are securely held from being separated by the pulling strain applied to the fruit, and as both wires 11 and 12 are attached to the ring 8 at their opposite ends the force of the pulling strain is received by the ring, thereby preventing any distortion of the receptacle 1.

What I claim as my invention, and desire to secure by Letters Patent, is—

1. As an article of manufacture, a fruit-picker consisting of a ring, wires each having a return bend and fastened at either end to said ring, an annular sleeve above said ring surrounding said wires, a basket formed by the divergence and bending of said wires into a globular or ellipsoid shape, and a pair of wires extending completely over said basket, said wires being bent apart in front to form an opening in the basket, converging at the top and united as they bend downward, the ends of said wires being attached to said ring.

2. As an article of manufacture, a fruit-picker consisting of a globular or ellipsoid basket having the front and rear portions consisting of a single pair of wires diverging in front to form an opening for the admission of fruit converging at the top and united as they bend downward to form the rear of the basket, an annular sleeve below said basket through which said wires pass and a ring below said band to which their ends are attached.

Dated this 28th day of February, 1905.

REGINALD WASHBURN.

Witnesses:
PENELOPE COMBERBACH,
RUFUS B. FOWLER.